United States Patent [19]

Kytta

[11] 4,357,746
[45] Nov. 9, 1982

[54] STUD FOR BRAKE BOOSTER

[75] Inventor: Oswald O. Kytta, South Bend, Ind.

[73] Assignee: The Bendix Corporation, Southfield, Mich.

[21] Appl. No.: 191,890

[22] Filed: Sep. 29, 1980

[51] Int. Cl.³ .................................... B21D 39/00
[52] U.S. Cl. ................................ 29/509; 411/176
[58] Field of Search ............ 29/509, 522 R; 411/176, 411/183

[56] References Cited
U.S. PATENT DOCUMENTS

| | | | |
|---|---|---|---|
| 2,041,809 | 5/1936 | Bernhard | 411/176 X |
| 2,713,186 | 7/1955 | Borowsky | 411/176 X |
| 2,939,160 | 6/1960 | Mitchell | 411/176 |
| 3,127,919 | 4/1964 | Swanstrom | 411/176 X |
| 4,114,670 | 9/1978 | Akashi et al. | 411/176 |

*Primary Examiner*—Leon Gilden
*Attorney, Agent, or Firm*—Leo H. McCormick, Jr.; Ken C. Decker

[57] ABSTRACT

A stud for connecting a first housing with a second housing. The stud has a cylindrical body with a head on a first end thereof. The head has a face with an irregular surface that extends from a guide surface to the periphery of the head. The guide surface extends through an opening in the first housing until the irregular surface engages the housing adjacent the opening. An orbital rotating tool engages the guide surface causing the guide surface to flare and engage the housing when a constant pressure is applied to the head. Thereafter, the material adjacent the opening flows into the irregular surface to seal the opening while preventing the stud from rotating when a torque is applied to the cylindrical body.

2 Claims, 6 Drawing Figures

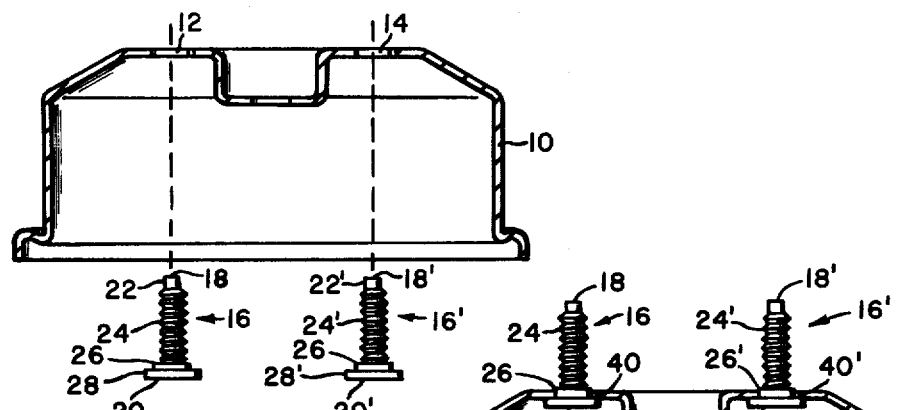
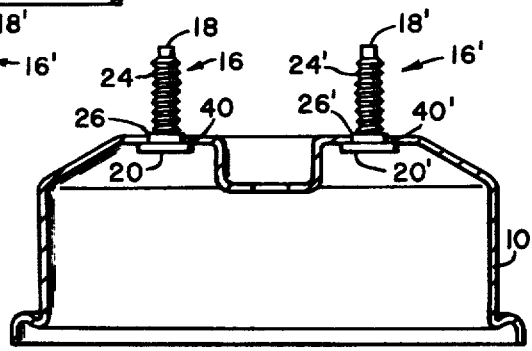
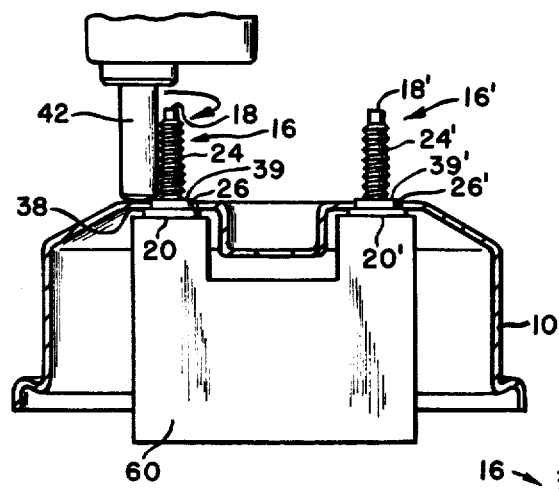
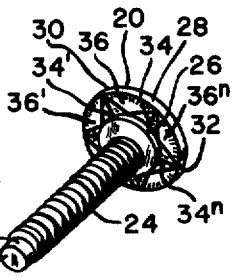
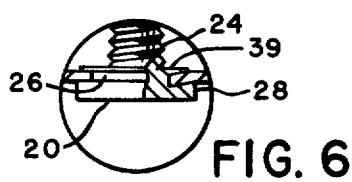
FIG. 2
FIG. 3
FIG. 1
FIG. 4
FIG. 6
FIG. 5

STUD FOR BRAKE BOOSTER

BACKGROUND OF THE INVENTION

This invention relates to a stud arrangement through which the housing of a servomotor is connected to a master cylinder.

When the movable wall in servomotors were suspended in air such as illustrated in U.S. Pat. No. 3,110,031, bolts were adequate to attach a master cylinder to the housing of the servomotor.

Later it was discovered that the operational characteristics of a servomotor could be enhanced if the movable wall were suspended in vacuum as illustrated by the servomotor shown in U.S. Pat. No. 3,292,502. In order to assure that the openings in such a servomotor were closed, seals were required on the input and output push rods. In addition, the mounting studs were welded to housing of the servomotor. Unfortunately, welding can change the molecular structure of the housing in such a manner that a vacuum leak may occur through the openings in the housing for the studs. For example, in a servomotor master cylinder combination such as shown in U.S. Pat. No. 4,022,081 because of the cantilever length between the fire wall studs and the end of the master cylinder, the flexing force induced into the shell under certain conditions may cause the weld to crack. When a weld cracks, a vacuum leak path can be produced and as a result the operation of the servomotor rendered inadequate to provide an input force to effect a brake application.

In order to reduce the stress placed on the weld, it was suggested that the housing of the servomotor be strengthened and the physical size of the stud head be increased to spread the forces over a larger area. However with an increasing effort to remove weight from the components in a vehicle such a solution has generally been unacceptable.

SUMMARY OF THE INVENTION

The stud and method of attachment thereof to a housing disclosed by this invention reduces the distortion of the material in the housing since the molecular structure is not effected by the attachment.

The stud has a head with a face that extends from a guide surface along a cylindrical body to the peripherical surface of the head. The face has an irregular surface with a series of identical projections. The cylindrical body is placed in an opening and the guide surface moved through the opening until the irregular surface contacts the housing adjacent the opening. Thereafter, a head member is brought into contact with the guide surface. The head member is rotated and moved toward the housing by a constant pressure applied to the head causing the guide surface to flare.

The flared portion of the guide surface engages the housing causing the material in the housing to flow into the irregular surface and seal the opening while preventing the stud from rotating should a torque be applied to the cylindrical body.

An advantage of the studs of this invention is that the molecular structure of the material adjacent the opening of a housing in which the studs are located is not changed as the studs are attached thereto.

Another advantage offered by this invention is that the flared surface of a stud acts on the housing to flow the material adjacent the opening in the housing where the stud is located into an irregular surface on the stud to seal the opening while preventing the stud from rotating should a torque be applied to the stud.

It is an object of this invention to provide a stud with a head having an irregular surface thereon in which material from a housing flows into the irregular surface to seal an opening in which the stud is located and to hold the stud stationary should a torque be applied to the stud.

These advantages and objects should be apparent from reading this specification and viewing the drawings.

BRIEF DESCRIPTION OF THE DRAWINGS

FIG. 1 is a perspective view of a stud made according to the principles of this invention.

FIG. 2 is a sectional view of a housing with studs aligned with openings therein.

FIG. 3 is a sectional view of the housing showing the studs inserted in the openings;

FIG. 4 is a side view of the housing and stud with a forming tool engaging the stud;

FIG. 5 is a view of the housing with the stud attached thereto; and

FIG. 6 is an enlarged view of the circumscribed line 6 of FIG. 5 showing the stud attached to the housing.

DETAILED DESCRIPTION OF THE INVENTION

The stud 16 shown in FIG. 1 is designed to attach a shell 10 to another member.

Shell 10 shown in FIG. 2, which forms part of a housing for a servomotor, has a series of openings 12 and 14 located on the front face thereof. The openings 12 and 14 are spaced in such a manner as to align studs in order to attach another device to housing 10 or attach housing 10 to a stationary wall such as the firewall on a vehicle.

Each stud 16 has a cylindrical body with a first end 18 and a second end 20. The first end has a guide surface 22 that aids in aligning a threaded section 24 in the center of a corresponding opening in the firewall or other device. The threaded section 24 extends to a guide surface 26 that projects from a head 28 on the second end of the stud.

The lead 28 has an annular periphery 30 and a face 32 that extends from the guide surface 26. Face 32 has an irregular surface with a series of apexes 34, 34' ... 34$^N$ that extend from the peripheral surface to the guide surface 26. The apexes are all in the same plane, that is, substantially perpendicular to the guide surface 26. A series of depressions 36, 36' ... 36$^N$ are located between the apexes 34, 34' ... 34$^N$. The exact shape depressions 36, 36' ... 36$^N$ can vary as long as the face 32 has an irregular surface.

As shown in FIG. 3, the first end 18 of the stud passes through the opening until the end of guide surface 26 is above the material in end plate 38 and apexes 34, 34' ... 34$^N$ on face 32 engages the material adjacent opening 14.

For some applications, openings 12 and 14 have a series of slots 40 and 40' shown in FIG. 3 that extend to about one-half of the distance from the guide surface 26 to the peripheral surface 30 on head 28.

With stud 16 located in opening 12, a fixture 60 as shown in FIG. 4, is brought into contact with head 20 to hold the head 20 stationary with respect to end plate 38. Thereafter, a tool 42 is brought into contact with the end 39 of guide surface 26. Tool 42 is the type disclosed in U.S. Pat. No. 3,173,281 wherein a constant pressure is applied to the end 39 while the tool is rotated at between 1500-2000 rpm. The tool is offset from 3°-6° along the center line of the stud 16 and thus the entire pressure from the tool is applied through a small differential area 41.

The axis of tool 42 follows a path which can be visualized as simulating an inverted cone. The orbital movement of the tool parallel to the wall of the cone creates an impression of wobbling even though the tool is stationary as it contacts the surface 39 of the guide surface 26 along a radius line generating from its center. With all pressure applied on this line a wave of material is formed ahead of the orbiting tool as it moves toward the head 20. With only a minute quantity of material being displaced per revolution, the material has time to flow and product a flare surface. The flared surface engages the material in the housing adjacent opening 12. Further movement of the tool 42 toward head 20 causes the material in housing 10 to flow into the irregular surface on face 32 and seal opening 16. As material from housing 10 is flowing into depressions 36, 36' . . . 36$^N$, some of the material from the flare produced by the guide surface 26 flows into slot 40, to assist the material in the irregular surface in resisting rotation torque applied to studs 16, 16' when the nut is put on threaded surface 24 to attach the housing 10 to another device.

When the operation of tool 42 has displaced the material in guide surface 26 in a plane substantially parallel to surface 50 of housing 10, tools 42' and 60 are removed. The resulting housing 10 with studs 16 and 16' is illustrated in FIG. 5. As shown in further detail in FIG. 6, guide surface 26 engages the housing 10 while material in the housing 10 has been displaced into the irregular surfaces formed on face 32 to hold the stud 16 in a fixed position should torque be applied to threads 24 by a nut.

For some applications rather than using an orbital tool, it may be sufficient to apply a constant pressure to flare the guide surface 26 such that a head is formed to sandwich the material against the opening in the housing such that the material flows into the irregular surface and a seal is produced to close the opening. However, the shape of the irregular surface and/or the slot 40, in the housing wherein the material from the housing and the guide surface 26 flows must be sufficient to withstand the torque produced when the nut is attached to the threaded section of the stud 16.

I claim:
1. A method of attaching a stud to a housing comprising the steps of:
    moving an end on the stud through an opening in the housing until a guide surface passes through the opening and an irregular surface contacts the housing adjacent one side of the opening;
    holding the irregular surface adjacent the housing;
    bringing a head on a tool into engagement with the guide surface;
    rotating the head at a speed of between 1200 and 2000 revolutions per minute; and
    applying a constant pressure to the guide surface through the head causing the guide surface to flare and engage the housing adjacent the other side of the opening, said constant pressure causing the material from the housing to flow into the irregular surface and establish a seal that prevents fluid communication through said opening and the stud from rotating when a torque is applied to said end.
2. The method, as recited in claim 1 further including the step of:
    offsetting the alignment of the head from 3°-6° with respect to the axial center of the stud so that the constant pressure is sequentially applied to an incremental area of the guide surface to develop the flare on the guide surface.

* * * * *